(12) United States Patent
Kiilunen (10) Patent No.: US 8,281,536 B2
(45) Date of Patent: Oct. 9, 2012

(54) WALL FIXTURE

(76) Inventor: Erik J. Kiilunen, Calumet, MI (US)

( * ) Notice: Subject to any disclaimer, the term of this patent is extended or adjusted under 35 U.S.C. 154(b) by 293 days.

(21) Appl. No.: 12/709,637

(22) Filed: Feb. 22, 2010

(65) Prior Publication Data

US 2010/0212257 A1    Aug. 26, 2010

Related U.S. Application Data

(60) Provisional application No. 61/202,363, filed on Feb. 23, 2009.

(51) Int. Cl.
*E04C 2/34* (2006.01)
(52) U.S. Cl. ............... 52/481.1; 52/655.1; 52/653.1
(58) Field of Classification Search ............ 52/481.1, 52/653.1, 655.1, 309.7, 167.3, 217, 293.3
See application file for complete search history.

(56) References Cited

U.S. PATENT DOCUMENTS

| | | | |
|---|---|---|---|
| 1,763,300 A * | 6/1930 | Gilbert | 52/634 |
| 4,551,957 A * | 11/1985 | Madray | 52/93.2 |
| 4,688,358 A * | 8/1987 | Madray | 52/93.2 |
| 5,848,512 A | 12/1998 | Conn | |
| 6,253,516 B1 | 7/2001 | D'Andrea et al. | |
| 6,269,607 B1 | 8/2001 | Ringlein et al. | |
| 7,104,018 B2 | 9/2006 | Romes et al. | |
| 7,213,379 B2 | 5/2007 | Carlson et al. | |
| 7,406,806 B2 * | 8/2008 | Hallissy et al. | 52/481.1 |
| 7,481,032 B2 | 1/2009 | Tarr | |
| 2006/0000175 A1 | 1/2006 | Neuman | |

OTHER PUBLICATIONS

Superior Polymer, Green Furring Solutions for Block & Poured Concrete Walls, http://superiorpolymer.com/ecostud.html, copyright 2009, 3 pages, Superior Polymer, Calumet, MI.

* cited by examiner

*Primary Examiner* — Basil Katcheves
(74) *Attorney, Agent, or Firm* — Michael Best & Friedrich LLP (57) ABSTRACT

A wall fixture positionable between interior and exterior walls of a structure and including a first member having a flange extending from a web, the flange including mounting locations spaced along a length of the flange for supporting fasteners securable at a plurality of locations spaced along the interior wall and a second member having a flange extending from a web. The second member can be adjustably securable to the first member such that a distance between exterior sides of the flanges is variable. The flange of the second member can include mounting locations spaced along the flange for supporting fasteners securable at a plurality of locations spaced along the exterior wall. The web of one of the first and second members can define apertures sized to receive at least one of plumbing, conduit and wires.

20 Claims, 10 Drawing Sheets

WALL FIXTURE

RELATED APPLICATIONS

This application claims priority to U.S. Provisional Patent Application No. 61/202,363, filed on Feb. 23, 2009, the entire content of which is incorporated herein by reference.

FIELD OF THE INVENTION

The present invention relates to a wall fixture, and more particularly to a wall fixture for furring a solid wall.

SUMMARY

With recent developments in building codes, exterior walls including basement walls, must meet R-15 or better insulation values. This has led to the development of Insulated Concrete Forms (ICFs), the use of Z-furring with foam panels, and other methods of insulating solid walls in general and in concrete, masonry, and block walls in particular. All of these methods of insulating solid walls have limitations, particularly with respect to secondary operations such as installing pipes, wires, plumbing, and other conduits. Other limitations include thermal bridging, porous construction, and outdoor exterior surfaces that do not provide adequate protection from the elements.

In some embodiments, the present invention provides a wall fixture positionable between an interior wall and an exterior wall of a structure, the interior wall being positionable substantially parallel to and spaced a distance from the exterior wall, each of the interior and exterior walls extending between a floor and a ceiling of the structure. The wall fixture includes a web defining multiple apertures extending through the web between opposite sides of the web and sized to receive at least one of plumbing, conduit, and wires, a first flange extending outwardly from a first end of the web and being engageable with one of the interior wall and the exterior wall, the first flange including multiple mounting locations spaced along a length of the first flange for supporting fasteners securable at multiple locations spaced along a height of the one of the interior wall and the exterior wall, and a second flange extending from a second end of the web opposite the first end of the web and being engageable with the other of the interior wall and the exterior wall. The second flange is pivotally connected to the web for movement relative to the web between a first orientation, in which the second flange is substantially parallel to the web, and a second orientation, in which the second flange is non-parallel to the web. The second flange includes multiple mounting locations spaced along a length of the second flange for supporting fasteners securable at multiple locations spaced along a height of the other of the interior wall and the exterior wall.

In some embodiments, the present invention provides, a wall fixture positionable between an interior wall and an exterior wall of a structure, the interior wall being spaced a distance from the exterior wall, each of the interior and exterior walls extending between a floor and a ceiling of the structure. The wall fixture includes a first member having a flange extending from a web, the flange including multiple mounting locations spaced along a length of the flange for supporting fasteners securable at multiple locations spaced along a height of one of the interior wall and the exterior wall, and a second member having a flange extending from a web, the second member adjustably securable to the first member such that a distance between exterior sides of the flanges is variable, the flange of the second member including multiple mounting locations spaced along a length of the flange for supporting fasteners securable at multiple locations spaced along a height of an other of the interior wall and the exterior wall, the web of one of the first member and the second member defining multiple apertures extending through the web between opposite sides of the web and sized to receive at least one of plumbing, conduit and wires. A stop is positioned on one of the first member and the second member to limit relative movement between the first and second members and to prevent movement of the other of the first member and the second member across the apertures.

The present invention also provides a wall mounting system including an interior wall and an exterior wall of a structure, the interior wall being spaced a distance from the exterior wall, each of the interior and exterior walls extending between a floor and a ceiling of the structure, and a wall fixture positionable between the interior wall and the exterior wall. The wall fixture includes a first member having a flange extending from a web, the flange including multiple mounting locations spaced along a length of the flange for supporting fasteners securable at multiple locations spaced along a height of the interior wall, a second member having a flange extending from a web, the second member adjustably securable to the first member such that a distance between exterior sides of the flanges is variable, the flange of the second member including multiple mounting locations spaced along a length of the flange for supporting fasteners securable at multiple locations spaced along a height of the exterior wall. The web of one of the first member and the second member defines multiple apertures extending through the web between opposite sides of the web and sized to receive at least one of plumbing, conduit and wires. The web of the first member includes a channel having multiple indentations spaced along a length of the channel. The web of the second member includes multiple protrusions spaced along a length of the web, the web of the second member being insertable into the channel of the first member in a direction substantially parallel to the length of the web of the second member such that the protrusions engage the indentations to adjustably secure the first member to the second member and vary the distance between the flanges.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
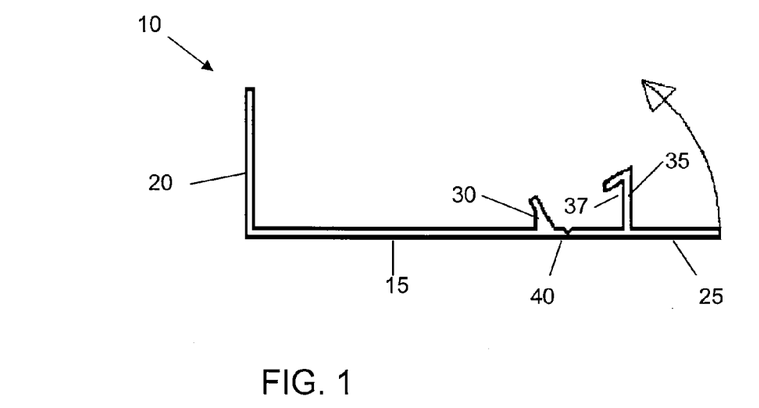
FIG. 1 is a cross-sectional view of a wall fixture according to one embodiment of the invention.

FIGS. 1-4 illustrate a wall fixture 10 according to some embodiments of the invention. As shown in FIG. 1, the wall fixture 10 includes a web 15, a first flange 20, and a second flange 25. The first flange 20 extends substantially perpendicularly from one end of the web 15 and the second flange 25 extends substantially perpendicularly from the opposite end of the web 15. A latch 30 extends from the web 15. A protrusion 35 extending from the second flange 25 defines a recess 37 for receiving the latch 30. The second flange 25 is pivotally coupled to the web 15 by a hinge 40.

Figure 3:
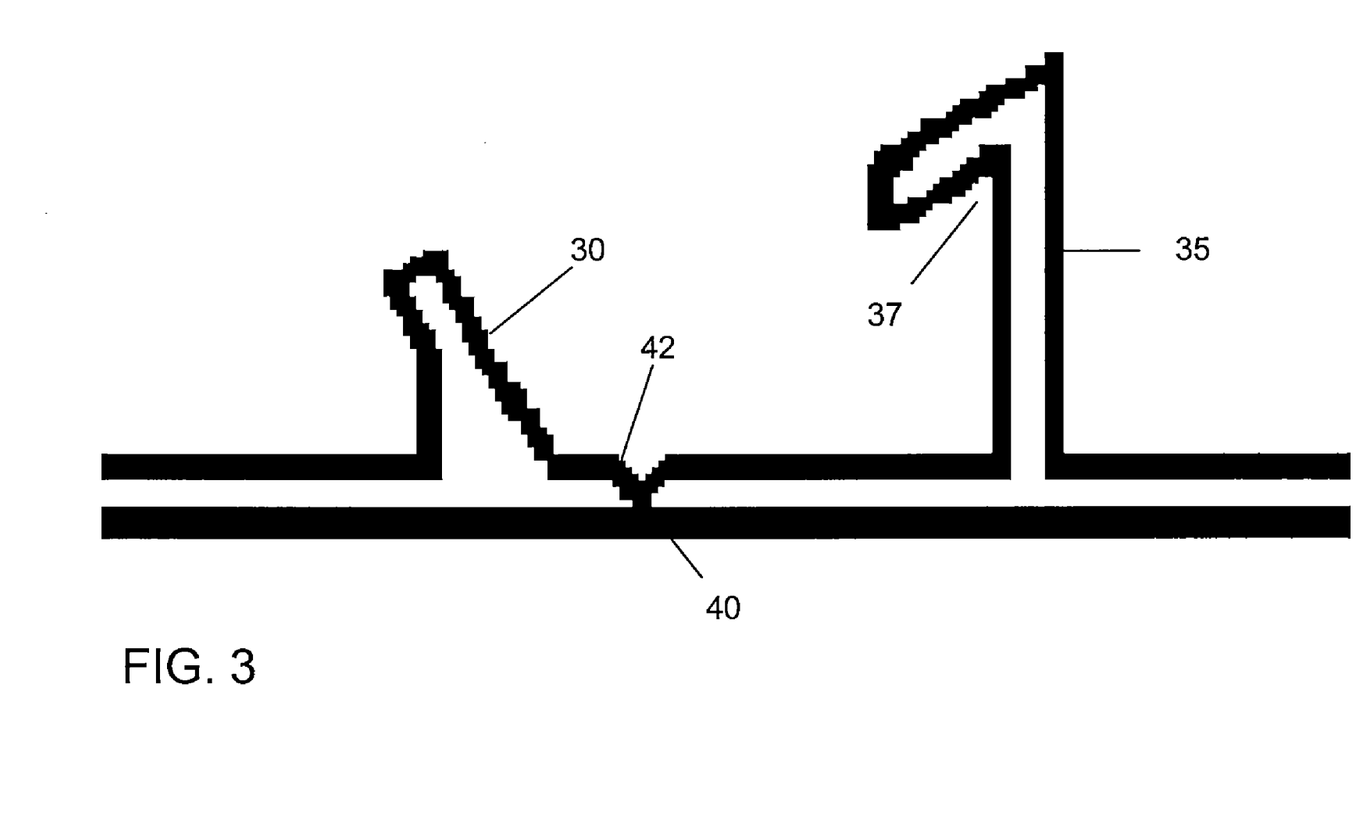
FIG. 3 is an enlarged view of a portion of the wall fixture of FIG. 1.

As shown in FIG. 3, a stop 42 is provided near the hinge 40. The wall fixture 10 can be made of plastic, including recycled plastic. The wall fixture 10 can be formed by extrusion. The hinge 40 can be a living hinge. In some embodiments, the latch 30 is received by a recess 37 defined by the second flange 25. The stop 42 can be supported by either the web 15 or the second flange 25. In some embodiments, both of the web 15 and the second flange 25 support a stop 42.

FIG. 1 shows the wall fixture 10 in a first orientation. In the first orientation, the second flange 25 is substantially parallel to the web 15. As shown by the arrow in FIG. 1, the second flange 25 can be pivoted about the hinge 40 to a second orientation.

Figure 2:
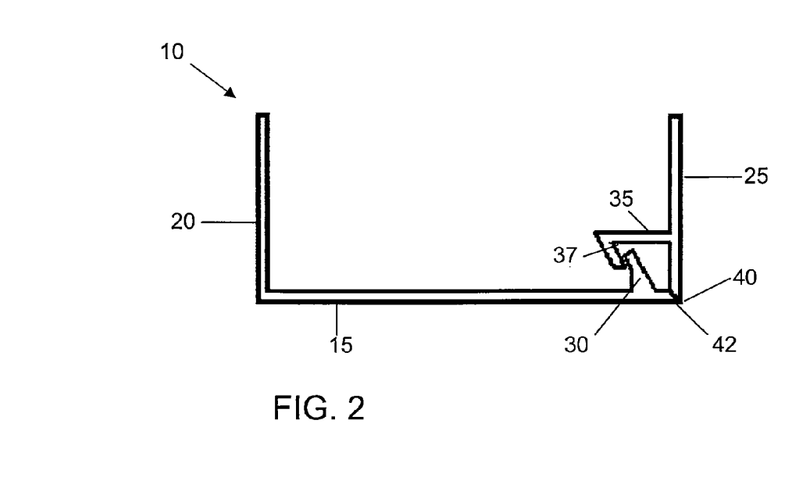
FIG. 2 is another cross-sectional view of the wall fixture of FIG. 1.

FIG. 2 shows the wall fixture 10 in the second orientation. In the second orientation, the second flange 25 is non-parallel to the web 15. In the illustrated embodiment, the second flange 25 is substantially perpendicular to the web 15. The latch 30 engages the recess 37 in the second protrusion 35 such that the second flange 25 is releasably secured in the second orientation. The stop 42 limits the movement of the second flange 25 relative to the web 15.

Figure 4:
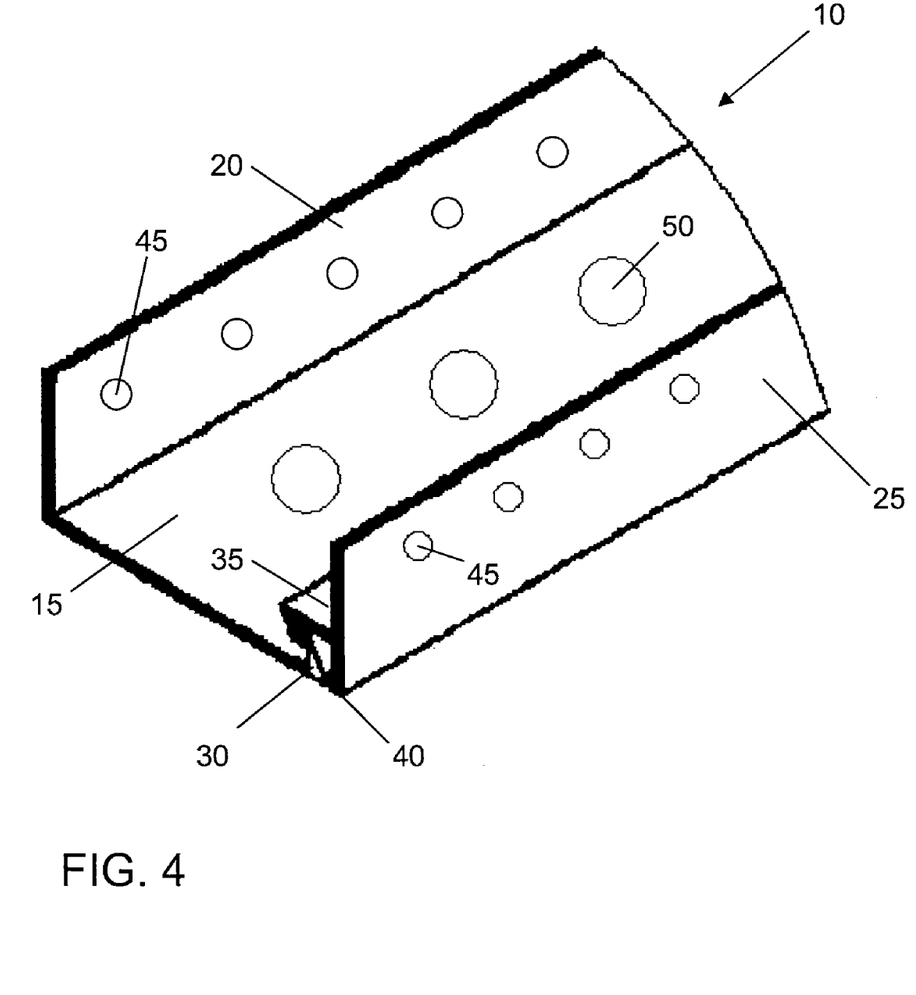
FIG. 4 is a partial perspective view of the wall fixture of FIG. 2.

FIG. 4 shows mounting locations 45 through the first flange 20 and the second flange 25 and apertures 50 through the web 15. The mounting locations 45 are spaced along a length of the first flange 20 and along a length of the second flange 25. The mounting locations 45 are sized to receive fasteners, such as, for example, threaded fasteners, nails, cohesive bonding materials, glue, adhesive, pins, clips, clamps, inter-engaging elements, and any combination of such fasteners. The apertures 50 are spaced along a length of the web 15 and allow plumbing, conduit, wire, pipe, or other such construction components to pass through the web 15.

In use, the wall fixture 10 is attached to an exterior wall, such as a concrete exterior basement wall. The wall fixture 10 in the first orientation is placed against the wall with the first flange 20 extending away from the wall. The second flange 25 is fastened to the wall by fasteners applied to the mounting locations 45. After the second flange 25 has been fastened to the wall, the wall fixture 10 is rotated to the second orientation and secured by the latch 30. A bonding material, such as closed cell foam, can be applied to the wall fixture 10. The bonding material flows through the apertures 45 thereby increasing bond strength between the wall fixture 10 and the wall, increasing the structural integrity of the wall fixture 10, and providing insulation value. An interior wall is fastened to the first flange 20 by fasteners applied to the mounting locations 45.

FIGS. 5-10 illustrate a wall fixture 65 according to other embodiments of the invention. As show in FIG. 5, the wall fixture 65 includes a first member 70 and a second member 75. The first member 70 includes a web 80 and a flange 85 extending substantially perpendicularly from the web 80. The web 80 defines a channel 90 that extends into the web 80. The channel 90 includes a series of indentations 95 defined between opposed rows of protrusions 97. A stop 99 is positioned at the bottom of the channel 90. In some embodiments, the flange 85 extends from the web 80 at an oblique angle.

Figure 5:
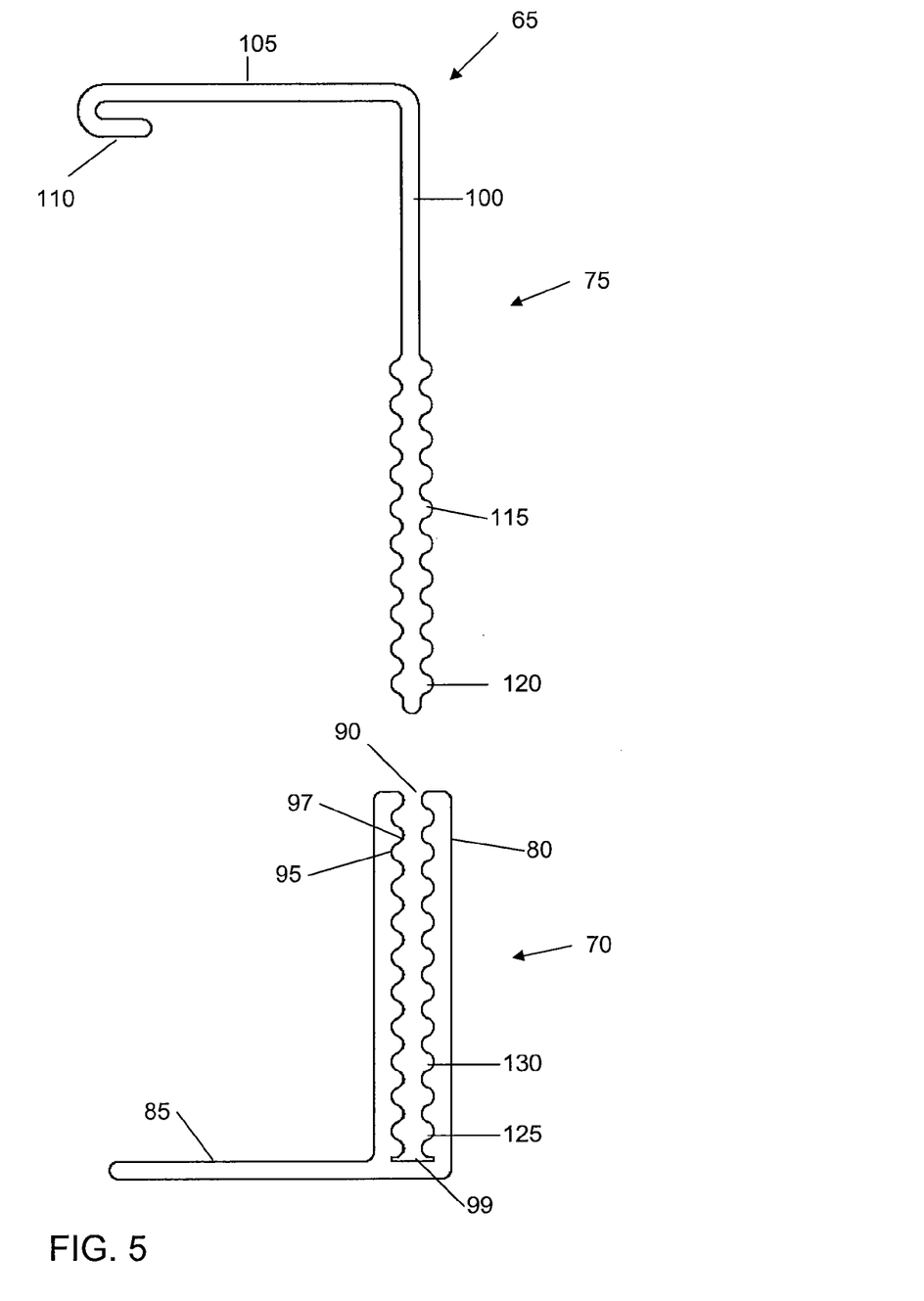
FIG. 5 is an exploded cross-sectional view of a wall fixture according to another embodiment of the invention.

The second member 75 includes a web 100 and a flange 105 extending substantially perpendicularly from the web 100. The flange 105 includes a hook-shaped end 110. A portion of the web 100 includes a series of protrusions 115. The protrusions 115 are sized and shaped to be received by the indentations 95 and to engage the indentations 95 and the protrusions 97. In some embodiments, the flange 105 extends from the web 100 at an oblique angle. In some embodiments, the flange 105 does not include the hook-shaped end 110.

Figure 6:
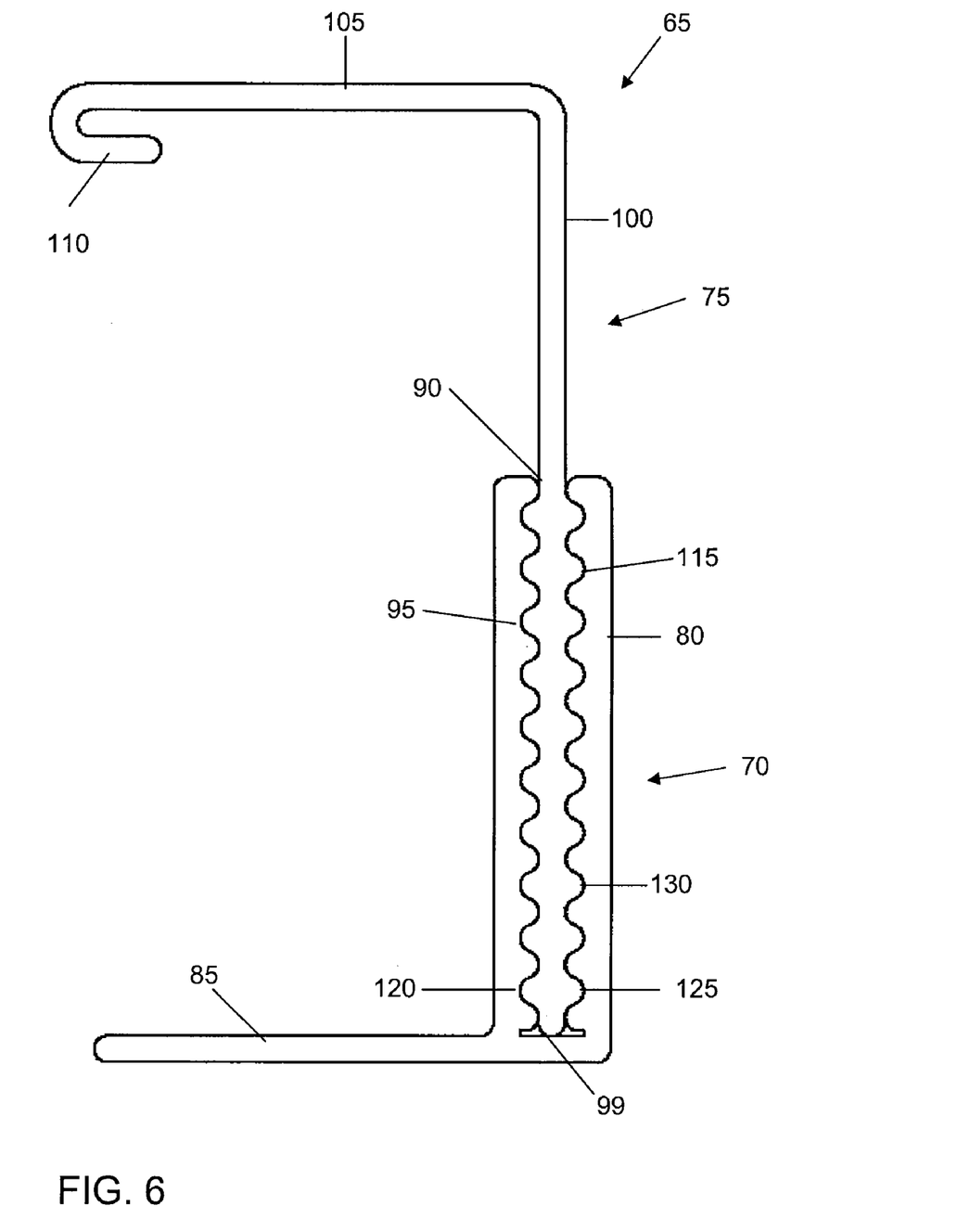
FIG. 6 is a cross-sectional view of the wall fixture of FIG. 5.
Figure 7:
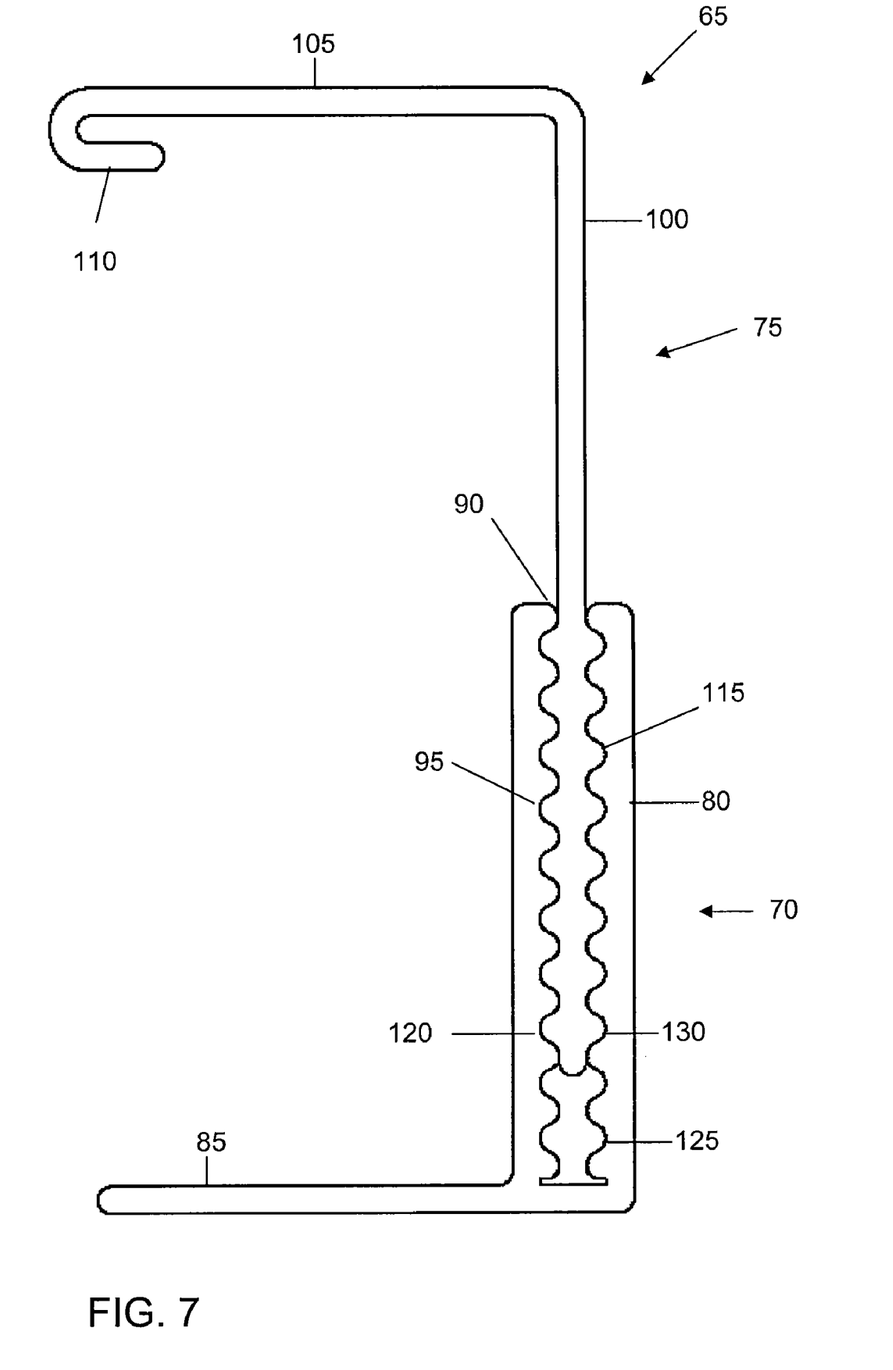
FIG. 7 is another cross-sectional view of the wall fixture of FIG. 5.

FIG. 6 shows a portion of the web 100 of the second member 75 inserted into the channel 90 of the first member 70. The protrusions 115 engage the indentations 95 thereby adjustably securing the first member 70 to the second member 75. The leading pair of protrusions 120 can be selectively inserted to multiple pairs of indentations. As shown in FIG. 6, the leading pair of protrusions 120 is inserted to a first position at a first pair of indentations 125, thereby spacing the flange 105 at a first distance from the flange 85. As shown in FIG. 7, the leading pair of protrusions 120 is inserted to a second position at a second pair of indentations 130, thereby spacing the flange 105 at a second distance from the flange 85. The distance between the flange 85 of the first member 70 and the flange 105 of the second member 75 varies depending on the selective insertion of the web 100 into the channel 90 such that the leading pair of protrusions 120 engages a selected pair of indentations 125.

Figure 8:
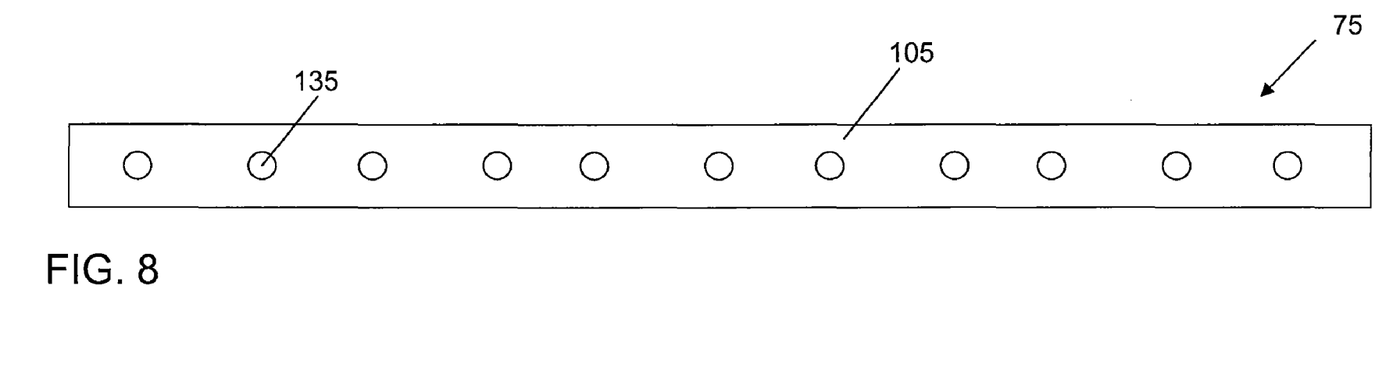
FIG. 8 is a top view of a portion of the wall fixture of FIG. 5.

FIG. 8 shows mounting locations 135 through the flange 105 of the second member 75. The mounting locations 135 are spaced along a length of the second member 75 and are sized to receive fasteners, such as, for example, threaded fasteners, nails, cohesive bonding materials, glue, adhesive, pins, clips, clamps, inter-engaging elements, and any combination of such fasteners.

Figure 9:
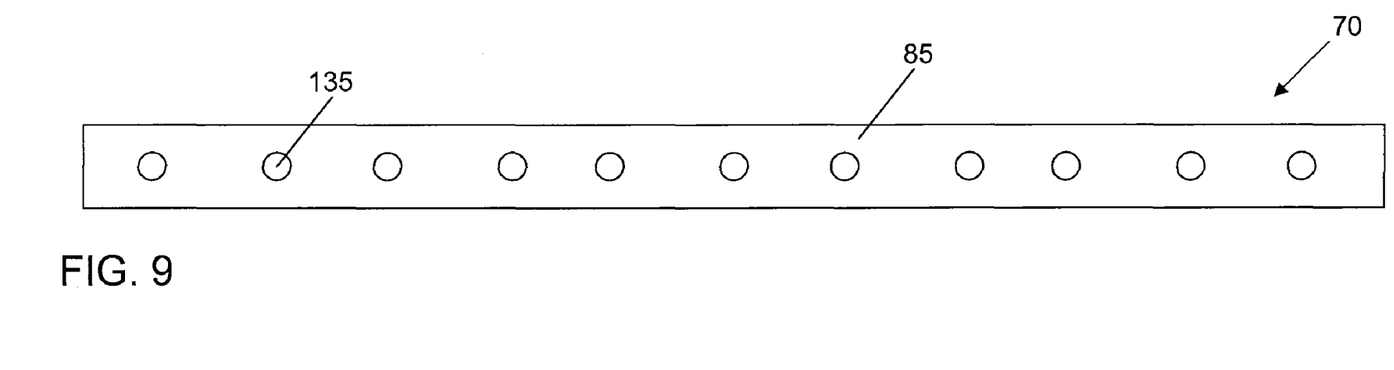
FIG. 9 is a bottom view of a portion of the wall fixture of FIG. 5.

FIG. 9 shows mounting locations 135 through the flange 85 of the first member 70. The mounting locations 135 are spaced along a length of the first member 70 and are sized to receive fasteners, such as, for example, threaded fasteners, nails, cohesive bonding materials, glue, adhesive, pins, clips, clamps, inter-engaging elements, and any combination of such fasteners.

Figure 10:
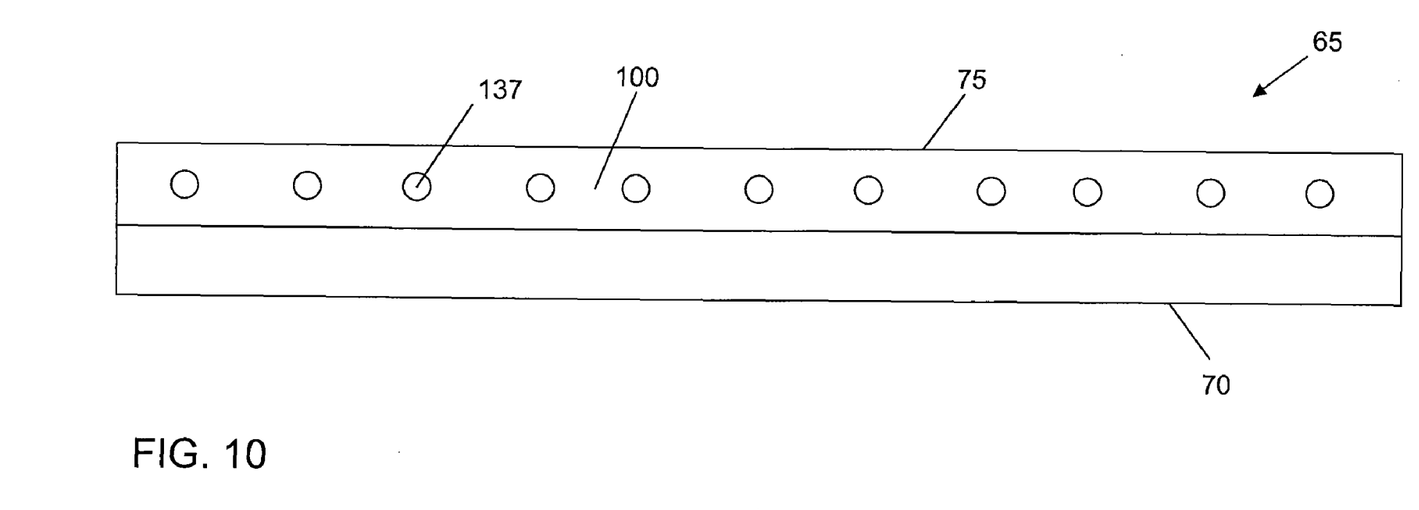
FIG. 10 is a side view of the wall fixture of FIG. 5.

FIG. 10 shows apertures 137 through the web 100 of the second member 75. The apertures 137 are spaced along the length of the second member 75. The apertures 137 allow plumbing, conduit, wire, pipe, or other construction components to pass through the web 100.

Figure 11:
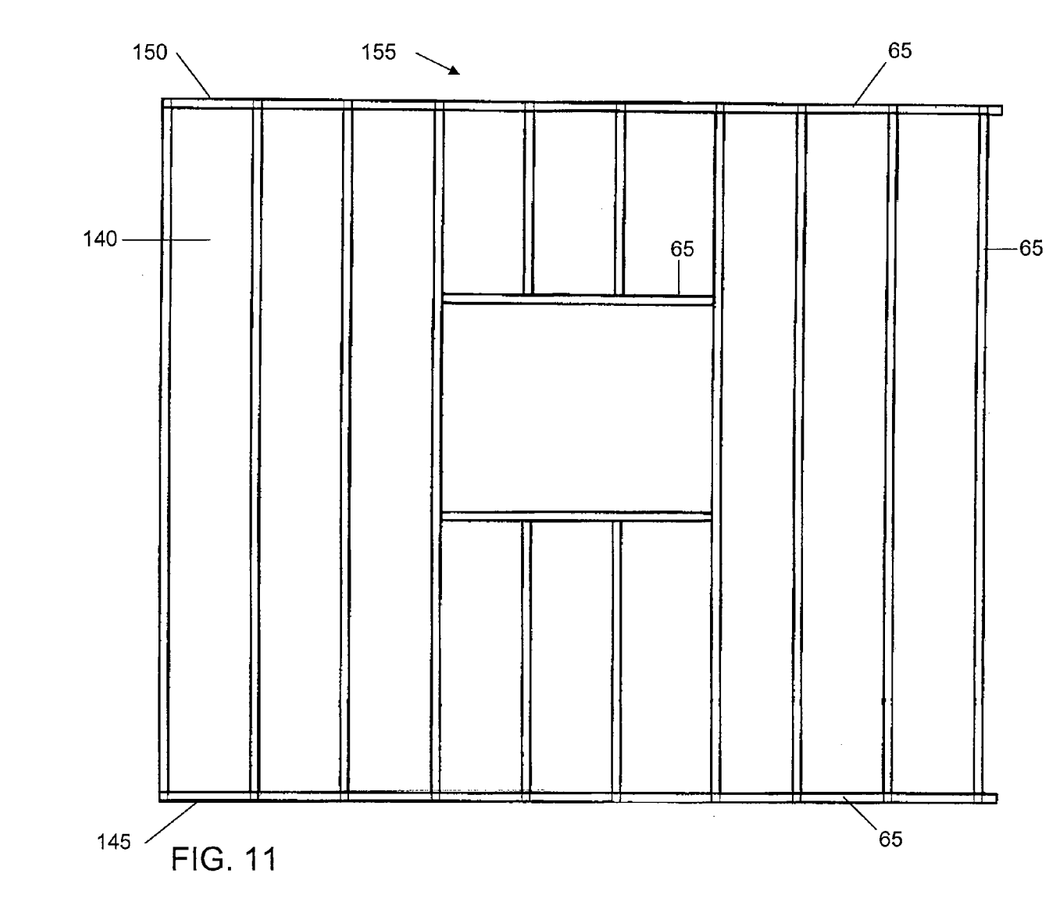
FIG. 11 is a front view of a wall mounting system constructed from the wall fixture of FIG. 5.

In use, the wall fixture 65 is attached to an exterior wall 140, such as a concrete basement wall, as shown in FIG. 11. The exterior wall 140 extends between a floor 145 and a ceiling 150. The first member 70 is placed against the wall 140 with the web 80 extending away from the wall 140. The flange 85 of the first member 70 is fastened to the wall 140 by fasteners applied to the mounting locations 135. After the flange 85 has been fastened to the wall 140, the second member 75 is inserted into the first member 70 in a direction substantially parallel to the length of the web 100. The second member 75 is inserted to a selected position. The protrusions 115 of the web 100 engage the indentations 95 in the channel 90 thereby adjustably securing the second member 75 to the first member 70. The second member 75 can be moved between possible positions along the web 80 of the first member 70 without the use of a tool. As shown in FIG. 6, the stop 99 limits relative movement between the first member 70 and the second member 75. The stop 99 prevents movement of the first member 70 across the apertures 95 such that the apertures 95 are not covered by the web 80 of the first member 70.

FIG. 11 illustrates a wall mounting system 155 including multiple wall fixtures 65. As described above, the wall fixtures 65 are fastened to the exterior wall 140. The wall fixtures 65 are fastened to each other using fasteners, such as, for example, threaded fasteners, nails, cohesive bonding materials, glue, adhesive, pins, clips, clamps, inter-engaging elements, and any combination of such fasteners. In use, the wall fixtures 65 allow a user to create a flat mounting surface even when the wall fixtures 65 are fastened to an exterior wall 140 that is not itself flat. The user adjusts the distance between the flanges 105 and the flanges 85 such that the flanges 105 are parallel and coplanar to each other to create the flat mounting surface.

Figure 12:
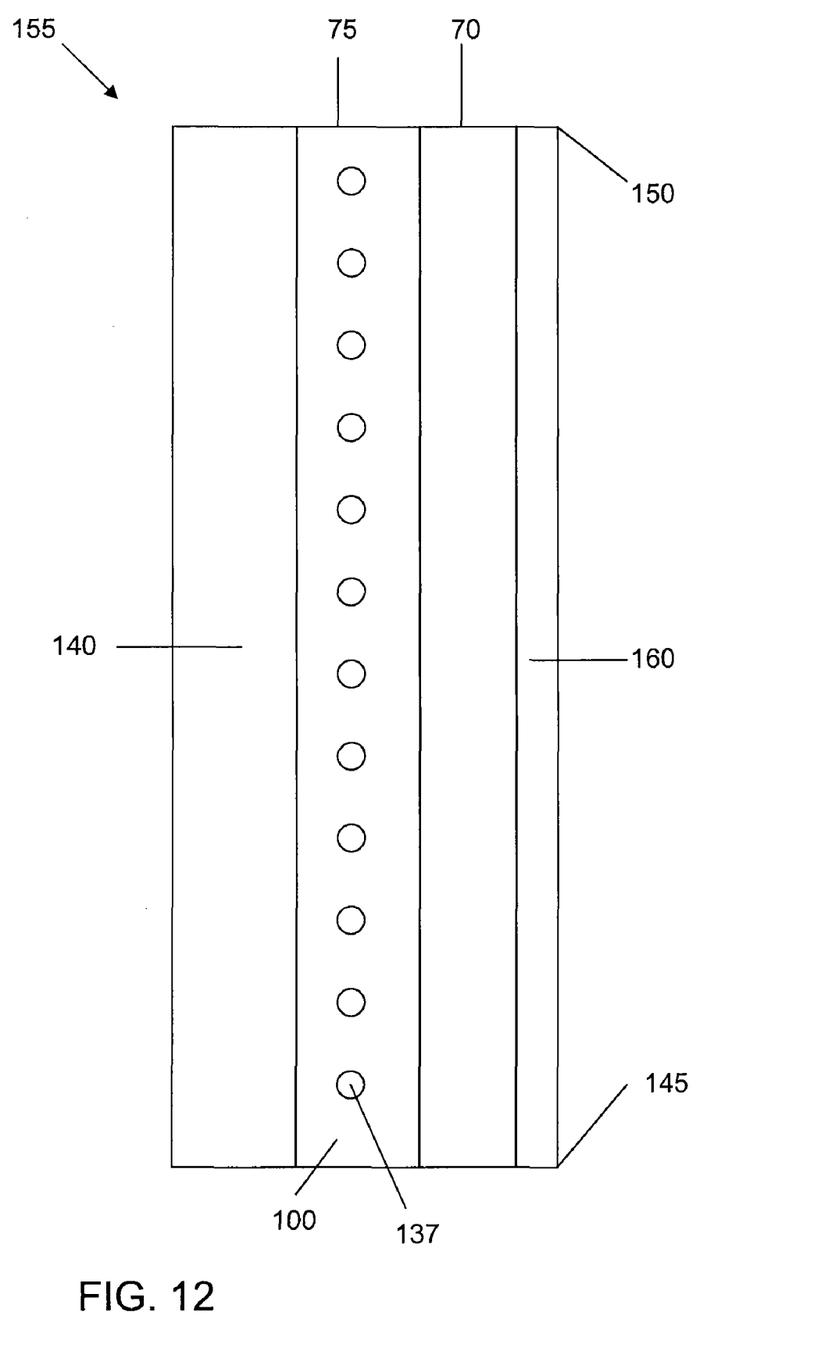
FIG. 12 is a cross-sectional side view of a portion of the wall mounting system of FIG. 11.

As shown in FIG. 12, an interior wall 160 is fastened to the wall fixture 65. The interior wall 160 extends between the floor 145 and ceiling 150 and can be constructed from, for example, foam panels, drywall, or other wall components. The flange 105 of the second member 75 is fastened to the interior wall 160 by fasteners applied to the mounting locations 135.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A wall fixture positionable between an interior wall and an exterior wall of a structure, the interior wall being positionable substantially parallel to and spaced a distance from the exterior wall, each of the interior and exterior walls extending between a floor and a ceiling of the structure, the wall fixture comprising:
   a web defining a plurality of apertures extending through the web between opposite sides of the web and sized to receive at least one of plumbing, conduit, and wires;
   a first flange extending outwardly from a first end of the web and being engageable with one of the interior wall and the exterior wall, the first flange including a plurality of mounting locations spaced along a length of the first flange for supporting fasteners securable at a plurality of locations spaced along a height of the one of the interior wall and the exterior wall;
   a second flange extending from a second end of the web opposite the first end of the web and being engageable with another of the interior wall and the exterior wall, the second flange being pivotally connected to the web for movement relative to the web between a first orientation, in which the second flange is substantially parallel to the web, and a second orientation, in which the second flange is non-parallel to the web, the second flange including a plurality of mounting locations spaced along a length of the second flange for supporting fasteners securable at a plurality of locations spaced along a height of the other of the interior wall and the exterior wall; and
   a latch positioned on one of the web and the second flange and being engageable with another of the web and the second flange to secure the second flange in the second orientation.

2. The wall fixture of claim 1, wherein the second flange includes a protrusion, and wherein the latch is engageable with the protrusion to releasably secure the second flange in the second orientation.

3. The wall fixture of claim 1, wherein the second flange defines a recess, and wherein the latch is engageable with the recess to releasably secure the second flange in the second orientation.

4. The wall fixture of claim 1, wherein the latch includes a first protrusion extending outwardly from the web and a second protrusion extending outwardly from the second flange and being engageable with the first protrusion to secure the second flange in the second orientation.

5. The wall fixture of claim 1, wherein the second flange defines a plurality of apertures extending through the second flange between opposite sides of the second flange, the plurality of apertures defining mounting locations for receiving fasteners for securing the second flange to interior walls of the structure.

6. The wall fixture of claim 1, wherein the second flange is pivotally connected to the web by a living hinge.

7. The wall fixture of claim 1, wherein at least one of the web, the first flange, and the second flange are formed from plastic.

8. The wall fixture of claim 1, wherein the wall fixture is formed from recycled plastic.

9. The wall fixture of claim 1, further comprising a stop supported on one of the web and the second flange and being oriented to prevent pivoting movement of the second flange relative to the web substantially beyond the second orientation.

10. The wall fixture of claim 1 wherein, when the second flange is in the second position, the second flange is substantially perpendicular to the web.

11. A wall fixture positionable between an interior wall and an exterior wall of a structure, the interior wall being spaced a distance from the exterior wall, each of the interior and exterior walls extending between a floor and a ceiling of the structure, the wall fixture comprising:
   a first member having a flange extending from a web, the flange including a plurality of mounting locations spaced along a length of the flange for supporting fasteners securable at a plurality of locations spaced along a height of one of the interior wall and the exterior wall;
   a second member having a flange extending from a web, the second member adjustably securable to the first member such that a distance between exterior sides of the flanges is variable, the flange of the second member including a plurality of mounting locations spaced along a length of the flange for supporting fasteners securable at a plurality of locations spaced along a height of an other of the interior wall and the exterior wall, the web of one of the first member and the second member defining a plurality of apertures extending through the web between opposite sides of the web and sized to receive at least one of plumbing, conduit and wires; and a stop positioned on one of the first member and the second member to limit relative movement between the first and second members and to prevent movement of an other of the first member and the second member across the plurality of apertures, wherein the web of the first member includes a channel having a plurality of indentations spaced along a length of the channel, and wherein the web of the second member includes a plurality of protrusions spaced along a length of the web, the web of the second member being insertable into the channel of the first member in a direction substantially parallel to the length of the web of the second member such that the protrusions engage the indentations to adjustably secure the first member to the second member and vary the distance between the flanges.

12. The wall fixture of claim 11, wherein the stop is located at an end of the channel.

13. A wall fixture positionable between an interior wall and an exterior wall of a structure, the interior wall being spaced a distance from the exterior wall, each of the interior and exterior walls extending between a floor and a ceiling of the structure, the wall fixture comprising:

a first member having a flange extending from a web, the flange including a plurality of mounting locations spaced along a length of the flange for supporting fasteners securable at a plurality of locations spaced along a height of one of the interior wall and the exterior wall;

a second member having a flange extending from a web, the second member adjustably securable to the first member such that a distance between exterior sides of the flanges is variable, the flange of the second member including a plurality of mounting locations spaced along a length of the flange for supporting fasteners securable at a plurality of locations spaced along a height of an other of the interior wall and the exterior wall, the web of one of the first member and the second member defining a plurality of apertures extending through the web between opposite sides of the web and sized to receive at least one of plumbing, conduit and wires; and a stop positioned on one of the first member and the second member to limit relative movement between the first and second members and to prevent movement of an other of the first member and the second member across the plurality of apertures, wherein the web of the first member includes a plurality of protrusions spaced along a length of the web, and wherein the web of the second member includes a plurality of protrusions spaced along a length of the web, the web of the second member being moveable along the web of the first member in a direction substantially parallel to the length of the web of the second member such that the protrusions of the first member engage the protrusions of the second member to adjustably secure the first member to the second member and vary the distance between the flanges.

14. The wall fixture of claim 13, wherein at least one of the first member and the second member are formed from plastic.

15. The wall fixture of claim 13, wherein the wall fixture is formed from recycled plastic.

16. A wall fixture positionable between an interior wall and an exterior wall of a structure, the interior wall being spaced a distance from the exterior wall, each of the interior and exterior walls extending between a floor and a ceiling of the structure, the wall fixture comprising:

a first member having a flange extending from a web, the flange including a plurality of mounting locations spaced along a length of the flange for supporting fasteners securable at a plurality of locations spaced along a height of one of the interior wall and the exterior wall;

a second member having a flange extending from a web, the second member adjustably securable to the first member such that a distance between exterior sides of the flanges is variable, the flange of the second member including a plurality of mounting locations spaced along a length of the flange for supporting fasteners securable at a plurality of locations spaced along a height of another of the interior wall and the exterior wall, the web of one of the first member and the second member defining a plurality of apertures extending through the web between opposite sides of the web and sized to receive at least one of plumbing, conduit and wires; and a stop positioned on one of the first member and the second member to limit relative movement between the first and second members and to prevent movement of another of the first member and the second member across the plurality of apertures, wherein the web of the first member is removeably securable, without requiring the use of a tool or a separate fastener, to the web of the second member in a first position such that the flange of the first member is spaced a first distance from the web of the second member and in a second position such that the flange of the first member is spaced a second distance from the web of the second member, the second distance being different than the first distance.

17. The wall fixture of claim 16, wherein the second distance is less than the first distance, and wherein the first member is moveable from the first position to the second position without requiring the use of a tool, and wherein the web of the first member limits movement toward the second position.

18. A wall mounting system comprising:

an interior wall and an exterior wall of a structure, the interior wall being spaced a distance from the exterior wall, each of the interior and exterior walls extending between a floor and a ceiling of the structure; and a wall fixture positionable between the interior wall and the exterior wall and including a first member having a flange extending from a web, the flange including a plurality of mounting locations spaced along a length of the flange for supporting fasteners securable at a plurality of locations spaced along a height of the interior wall;

a second member having a flange extending from a web, the second member adjustably securable to the first member such that a distance between exterior sides of the flanges is variable, the flange of the second member including a plurality of mounting locations spaced along a length of the flange for supporting fasteners securable at a plurality of locations spaced along a height of the exterior wall, the web of one of the first member and the second member defining a plurality of apertures extending through the web between opposite sides of the web and sized to receive at least one of plumbing, conduit and wires;

wherein the web of the first member includes a channel having a plurality of indentations spaced along a length of the channel; and wherein the web of the second member includes a plurality of protrusions spaced along a length of the web, the web of the second member being insertable into the channel of the first member in a direction substantially parallel to the length of the web of the second member such that the protrusions engage the indentations to adjustably secure the first member to the second member and vary the distance between the flanges.

19. The wall mounting system of claim 18, wherein the wall fixture includes a stop positioned on the first member to limit relative movement between the first and second members and to prevent movement of the second member across the plurality of apertures.

20. The wall mounting system of claim 19, wherein the stop is located at an end of the channel.

* * * * *